United States Patent
Miller

[11] 3,976,164
[45] Aug. 24, 1976

[54] STEP ASSEMBLY FOR AN EARTH-MOVING VEHICLE

[75] Inventor: Calvin L. Miller, Aurora, Ill.

[73] Assignee: Caterpillar Tractor Co., Peoria, Ill.

[22] Filed: May 19, 1975

[21] Appl. No.: 578,577

[52] U.S. Cl. .................. 182/89; 182/90; 280/166
[51] Int. Cl.² ........................... B60R 3/00
[58] Field of Search .......... 182/89, 90, 91, 92; 280/166, 163, 165; 61/48; 114/219; 248/21, 22, 8, 9

[56] References Cited
UNITED STATES PATENTS

| | | | |
|---|---|---|---|
| 2,038,968 | 4/1936 | Summers | 248/21 |
| 3,083,785 | 4/1963 | Hyman | 182/89 |
| 3,144,228 | 8/1964 | Kass | 248/21 |
| 3,339,907 | 10/1967 | Parker | 114/219 |
| 3,404,534 | 10/1968 | Cunney | 61/48 |
| 3,455,269 | 7/1969 | Dean | 114/219 |
| 3,603,429 | 9/1971 | Shepherd | 280/166 |
| 3,734,534 | 5/1973 | Brooks | 280/165 |
| 3,798,916 | 3/1974 | Schwemmer | 114/219 |
| 3,887,216 | 6/1975 | Perry | 280/163 |

Primary Examiner—Reinaldo P. Machado
Attorney, Agent, or Firm—Phillips, Moore, Weissenberger, Lempio & Strabala

[57] ABSTRACT

In an earth-moving vehicle, a step assembly having a step member and an attachment device is affixed outwardly of the frame of the vehicle to allow longitudinal displacement of the step member upon contacting an obstruction. The attachment device comprises a plurality of flexible members each having a flexible cable with rigid threaded rods affixed at each end for securing the step member to the vehicle frame or bracket affixed thereto; and an elastomeric tubular member encompassing the flexible cable, the elastomeric member acting as a spacer to spatially remove the step member from the vehicle frame while allowing the step member to deflect longitudinally relative to the vehicle frame upon contacting an obstruction adjacent to the path of the vehicle and to return the step member to its operating position upon clearing the obstruction. The attachment means while allowing longitudinal deflection, limits downward deflection relative to the vehicle frame when the step is used by an operator or repairman in mounting or dismounting the vehicle.

8 Claims, 6 Drawing Figures

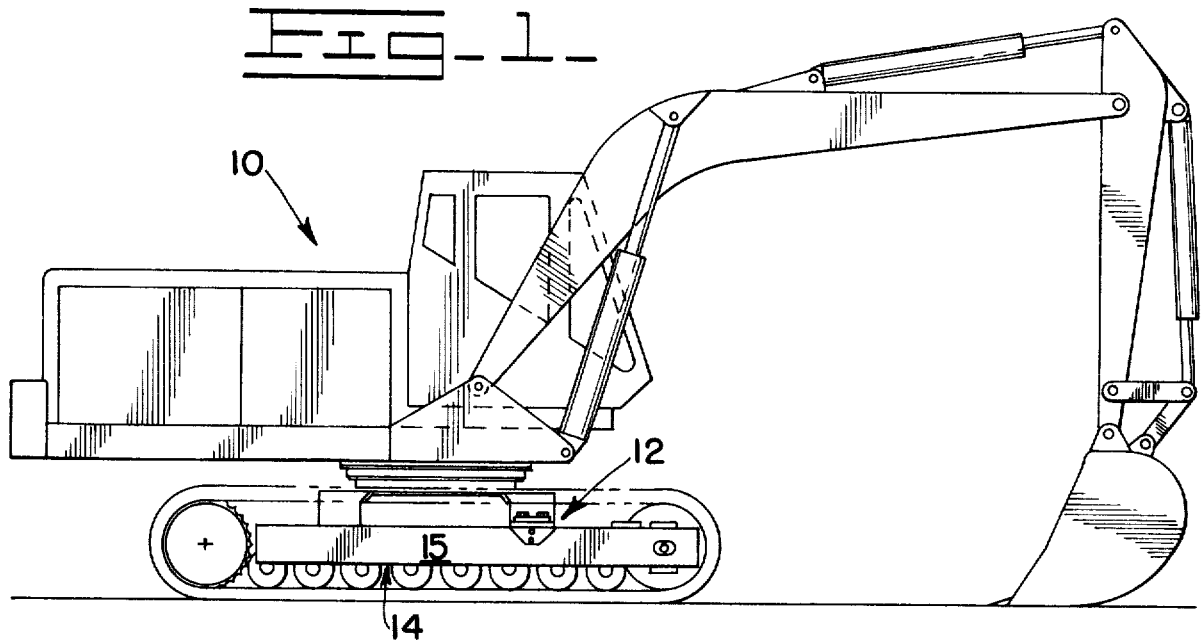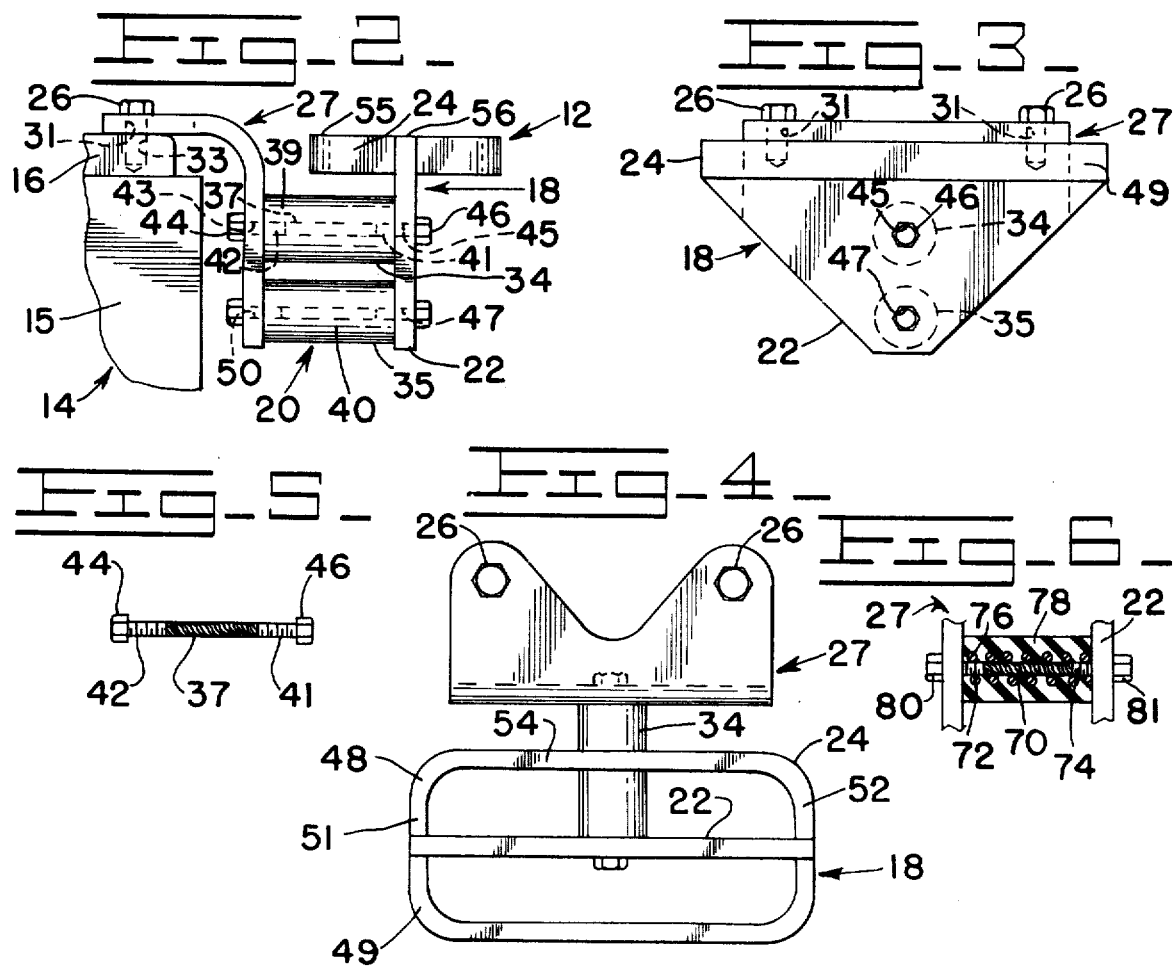

STEP ASSEMBLY FOR AN EARTH-MOVING VEHICLE

BACKGROUND OF THE INVENTION

Earth-moving machines, particularly tracked vehicles such as excavators, have reached proportions such that it is necessary to provide access steps to enable the operator or repairman to reach the operator's cab or the engine compartment. Location of such steps in tracked vehicles is particularly difficult as the construction of the tracks requires the step to be mounted outwardly of the track frame. In so mounting the step outwardly of the track frame, it has been found that rigid steps are easily broken when the vehicle is moved from one position to another as the step contacts an obstruction.

A step or ladder to mount such a vehicle must provide a relatively rigid footrest as the operator or repairman places his weight upon the step, therefore deflection in a downward direction relative to the vehicle frame must be limited. Various types of retracting ladders have been designed for large construction vehicles; however, such a ladder is inappropriate in a tracked vehicle where it is necessary to locate the mounting step on the track frame, as retraction of the ladder into the track frame could interfere with the rotating parts therein. Steps of a type which hang below the vehicle frame in the form of a U-shaped member have also been designed, such steps providing deflection both longitudinally of the vehicle frame and laterally of the vehicle frame. However, a step of this design is also generally inappropriate for tracked vehicles. Hanging a U-shaped member from the track frame is inadvisable for two reasons. First, deflection of such a step inwardly while the vehicle is moving could cause serious interference with the moving members of the track assembly. Secondly, to locate such a step below the track frame would be of no advantage, as the footrest portion of a hanging step would then be in close proximity to the ground level. Furthermore, insertion of a foot of the operator in such a hanging step could possibly result in the operator's foot becoming entangled with the moving parts of the tracked vehicle.

SUMMARY OF THE INVENTION

It is an object of this invention to provide a vehicle step exterior of exposed moving parts of the vehicle which will deflect longitudinally upon contacting an obstruction and return to a normal operating position when clear of the obstruction.

It is a further object of this invention, while fulfilling the above objects, to provide a vehicle step with limited deflection.

Broadly stated, the invention is a step assembly for a vehicle having frame means, the step assembly comprising a step member having a vertical attachment plate and a horizontal footrest affixed to the top of the attachment plate, and attachment means for mounting the step member spatially removed from the vehicle. The attachment means allowing the step member to deflect generally longitudinally of the frame means upon application of a given force thereto longitudinally of the frame means while allowing lesser deflection in a downward direction relative to the frame means upon application of an equal force in a downward direction relative to the frame means.

BRIEF DESCRIPTION OF THE DRAWINGS

These and other objects of the invention will become apparent from a study of the following specification and drawings, in which:

FIG. 1 illustrates a representative earth-moving vehicle, in this case, a tracked excavator, having installed on the track frame a step assembly according to the invention.

FIG. 2 is a side view of the step assembly installed on the earth-moving machine shown in FIG. 1.

FIG. 3 is an elevation view of the step assembly illustrated in FIG. 2.

FIG. 4 is a plan view of the step assembly illustrated in FIGS. 2 and 3.

FIG. 5 is a detailed view of the cable assembly.

FIG. 6 is an alternate embodiment showing partly in cross-section the flexible attachment means.

DETAILED DESCRIPTION OF THE PREFERRED EMBODIMENTS

Referring to FIG. 1 of the drawings, an earth-moving vehicle 10 is illustrated, in this case, a tracked excavator illustrates the earth-moving vehicle. It is to be understood that the vehicle step disclosed herein is in no way limited to application to tracked vehicles, but may be used on any moving vehicle and is particularly applicable to vehicles where the vehicle step is to be located exterior of the vehicle frame and the possibility of contacting an obstruction exists. Mounted on earth-moving vehicle 10 is a step assembly 12 affixed to and extending outwardly from frame means 14.

Referring to FIG. 2, frame means 14 comprises frame member 15 and mounting block 16 with bracket 27 affixed thereto. Mounting block 16 and bracket 27 are not necessary elements of the invention. Step assembly 12 may instead be affixed directly to frame means 14. Step assembly 12 is comprised of step member 18 and attachment means 20. Step member 18 is in turn comprised of a vertical attachment plate 22 and horizontal footrest 24 affixed to the top thereof. Attachment means 20 comprises flexible member 34 and flexible member 35 which are affixed to bracket 27. Bracket 27 defines a plurality of holes 31 for receiving bolts 26, bolts 26 threadably engaged in holes 33 defined by the frame means 14. Flexible member 34 and flexible member 35 are of identical construction in the preferred embodiment; thus, only flexible member 34 will be described.

A cable 37 is encompassed by a tubular elastomeric member 39. Rigid threaded rod 42 affixed to one end of flexible cable 37 extends through hole 43 defined in bracket 27 and has threaded thereon attachment nut 44, flexible cable 37 extending outwardly in a direction away from and perpendicular to longitudinal axis of frame means 14. Similarly, rigid threaded rod 41 affixed to the other opposite end of cable 37 extends through hole 45 of vertical attachment plate 22 with attachment nut 46 threadably engaged thereon exterior of vertical attachment plate 22. Tubular elastomeric member 39 spatially removes step member 18 from frame means 14, in the preferred embodiment by attachment to bracket 27. Bracket 27 defines hole 43 for receiving flexible member 34, and further defines hole 50 substantially vertically below hole 43 for receiving flexible member 35. The axis of holes 43 and 50 is substantially perpendicular to the longitudinal axis of frame means 14.

It is to be understood that flexible member 34 and flexible member 35 could be mounted directly to frame member 15 when frame member 15 is provided with appropriate mounting holes arranged substantially vertically and the axis of such mounting holes substantially perpendicular to the longitudinal axis of frame means 14.

Referring to FIG. 5, flexible cable 37 is shown with rigid threaded rod 41 and rigid threaded rod 42 integrally formed at either end thereof. Attachment nut 44 and attachment nut 46 are shown threadably engaged on rigid threaded rod 42 and rigid threaded rod 41, respectively.

Referring to FIG. 3, vertical attachment plate 22 of step member 18 may be of triangular shape as illustrated therein. Hole 45 is position substantially on the bisector of the angle formed at the truncated vertex, with a second hole 47 for receiving flexible means 35 located substantially directly below hole 45 and spaced apart therefrom correspondingly with hole 43 and hole 50. It is to be understood that the shape of vertical attachment plate 22 is in no way limiting, however, hole 45 and hole 47 are to be aligned substantially vertically on a line bisecting the center of attachment plate 22.

Referring to FIG. 4, step assembly 12 is shown in plan view. Footrest 24, in the preferred embodiment, is comprised of two U-shaped members 48 and 49, each U-shaped member identical with the other. In U-shaped member 48, one end of leg 51 and one end of leg 52 are affixed to the upper portion of attachment plate 22. Leg 51 and leg 52 connect at the second opposite ends with a base portion 54 of U-shaped member 48. Base portion 54 runs substantially parallel to attachment plate 22. The top edge 55 of U-shaped member 48 lying generally in the same plane as top edge 56 of attachment plate 22 (see FIG. 2).

In operation, as earth-moving vehicle 10 is traveling in one direction, or another, contact by step assembly 12 with an obstruction will cause deflection in the longitudinal direction relative to frame means 14. Referring to FIG. 3, contact with an obstruction will cause rightward or leftward movement of step member 18. If step member 18 were rigidly affixed to frame means 14, such contact would result in step assembly 12 being displaced permanently in one direction or the other, depending on the direction of the vehicle travel. Furthermore, such contact with an obstruction may, in fact, tear away step assembly 12 from the vehicle. With flexible member 34 and flexible member 35 installed, such contact results in a leftward or rightward deflection of step member 18 until such force causing the deflection is removed, at which time step member 18 will return to the operating position illustrated in FIG. 3 by the resiliency in elastomeric member 39 and elastomeric member 40.

Referring to FIG. 2, when a vertical load is imposed in a downward direction on horizontal footrest 24, such as is encountered when an operator or repairman mounts or dismounts earth-moving vehicle 10, flexible member 34 is placed in tension and flexible member 35 is placed in compression. In view of flexible cable 37 and rigid threaded rods 41 and 42 being retained by attachment nuts 44 and 46, flexible member 34 is prevented from extending. Therefore, the force imposed by a vertical load on footrest 24 is absorbed by compression of elastomeric member 40. Elastomeric member 40 may be designed with sufficient resiliency to severely limit compression of that element; therefore, deflection in the vertical direction is accordingly limited. Although of infrequent occurrence, vertical forces imposed upwardly on attachment plate 22 will result in the opposite forces in flexible member 34 and flexible member 35, flexible member 35 being in tension and flexible member 34 being in compression. Since it is possible that contact with an obstruction would result in such a vertical force being imposed upwardly on step member 18 through attachment plate 22, elastomeric member 39 may be made of greater resiliency than elastomeric member 40 thereby allowing compression of flexible means 34, and a consequent greater deflection upwardly in a vertical direction than is allowed in the downward direction when a man or operator places his weight on footrest 24.

Referring to FIG. 6, an alternate embodiment of flexible means 34 and flexible means 35 is illustrated. Flexible cable 70 has integrally formed at either end rigid rod 72 and rigid rod 74 for extending through bracket 27 and vertical attachment plate 22 of step member 18, respectively. Elastomeric member 78 has encapsulated therein spring 76, the inside diameter of spring 76 being slightly larger than the diameter of cable 70 and rigid threaded rods 72 and 74. Elastomeric member 78 encompasses flexible cable 70, and acts as a spacer and a resilient member as in the preferred embodiment. The addition of a spring 76 working in cooperation with the resiliency of elastomeric member 78 adds an additional degree of resiliency to the flexible means. Again, choice of springs with varying degrees of resiliency may be employed. Rigid threaded rod 72 extending through bracket 27 is secured thereto by attachment nut 80, and rigid threaded rod 74 extending through attachment plate 22 of step member 18 is secured thereto by attachment nut 81.

A second alternative embodiment, not illustrated, would integrally form one of the attachment nuts as an enlarged head thus forming a through bolt with a flexible shank of length equal to the elastomeric member, the second attachment nut threadably engaged thereon to secure the step member to the frame means.

It is to be understood that the design shown for footrest 24 is in no way limiting, the purpose of the two U-shaped members 48 being to provide a degree of friction to the operator's footstep, any horizontal footrest providing such degree of friction would be suitable for this invention.

What is claimed is:

1. In a vehicle having frame means, a step assembly comprising:
   a step member having a vertical attachment plate and a horizontal footrest affixed to the top of the attachment plate; and
   attachment means interconnecting said step member and said frame means for mounting said step member horizontally separated from said vehicle, said attachment means allowing said step member to deflect generally longitudinally of the frame means upon application of a given force thereto longitudinally of the frame means while allowing lesser deflection in a downward direction relative to the frame means upon application of said given force thereto in a downward direction relative to the frame means.

2. The apparatus set forth in claim 1 wherein the attachment means comprise a plurality of flexible attachment means for attaching the step member to the frame means.

3. The apparatus set forth in claim 1 wherein the frame means comprises a frame member and a bracket rigidly affixed to said frame member;

wherein the attachment means interconnecting the step member and the frame means interconnects the step member and said bracket.

4. The apparatus of claim 3 wherein the bracket further comprises:

a bracket defining at least two mounting holes arranged substantially vertically with the axis of each hole perpendicular to the longitudinal axis of the frame means;

wherein the attachment plate of the step member defines at least two holes arranged substantially vertically and spaced correspondingly with the mounting holes of the bracket;

and further wherein the attachment means comprises two flexible attachment members, each flexible attachment member comprising a first and a second rigid threaded rod, a flexible cable member integrally formed with the first rigid threaded rod at one end and with the second rigid threaded rod at the other opposite end, an elastomeric tubular member encompassing said flexible cable member, and a pair of attachment nuts threadably engageable on said rigid threaded rods;

said first threaded rod of each flexible attachment member disposed through a mounting hole in said bracket, said elastomeric tubular member encompassing said flexible cable member extending outwardly in a direction away from and perpendicular to the longitudinal axis of the frame means, the second threaded rod disposed through the corresponding hole of the step member while the pair of attachment nuts are threadably engaged on the threaded rods to securely affix said step member to said bracket.

5. The apparatus as set forth in claim 4 wherein the horizontal footrest comprises a horizontally oriented U-shaped member having two legs, each affixed at one end to opposite ends of the upper portion of the attachment plate, and a base portion rigidly connecting the second other ends of the two legs, the base portion running substantially parallel to the attachment plate, the top surface of the horizontal U-shaped member lying generally in the same plane as the top edge of the attachment plate.

6. The apparatus set forth in claim 3 wherein the bracket further comprises:

a bracket defining a plurality of mounting holes arranged substantially vertically with the axis of said holes perpendicular to the longitudinal axis of the vehicle frame means;

wherein the attachment plate of the step member defines a plurality of holes arranged substantially vertically and spaced correspondingly with the mounting holes of the bracket;

and further wherein the flexible attachment means comprises at least two flexible attachment members each flexible attachment member comprising a flexible cable, a rigid rod and a rigid threaded rod, the rigid rod integrally formed at one end of the flexible cable and the rigid threaded rod integrally formed at the other opposite end of the flexible cable, the free end of the rigid rod having an enlarged head of dimension greater than the mounting hole of the bracket, an elastomeric tubular member encompassing said flexible cable member, and an attachment nut threadably engageable on the threaded rod;

said rigid rod of each flexible attachment member disposed through a mounting hole of the bracket, the flexible cable extending outwardly and perpendicular to the frame means, the elastomeric tubular member encompassing said flexible cable member, the rigid threaded rod disposed through the hole of the attachment plate with the attachment nut threadably engaged thereon to securely affix said step member to said bracket.

7. The step assembly set forth in claim 5 wherein the elastomeric tubular member further comprises an elastomeric tubular element and a spring, said spring of diameter slightly greater than the flexible cable member and said spring integrally encapsulated within the elastomeric tubular element.

8. The step assembly as set forth in claim 6 wherein the elastomeric tubular member further comprises an elastomeric tubular element and a spring, said spring of dimension slightly greater than the flexible cable member and said spring encapsulated in the elastomeric tubular element.

* * * * *